United States Patent [19]
Orlando

[11] 3,774,938
[45] Nov. 27, 1973

[54] VELOCITY RESPONSIVE SENSOR FOR VEHICLE OCCUPANT RESTRAINTS
[75] Inventor: Vincent A. Orlando, Clearwater, Fla.
[73] Assignee: General Motors Corporation, Detroit, Mich.
[22] Filed: Sept. 25, 1972
[21] Appl. No.: 292,085

[52] U.S. Cl. ............ 280/150 AB, 180/91, 180/103, 200/61.45 R
[51] Int. Cl. ............................................ B60r 21/08
[58] Field of Search ................ 280/150 AB; 180/91, 180/103; 200/61.45 R, 61.48, 61.53

[56] References Cited
UNITED STATES PATENTS
3,556,556  1/1971  Goetz ........................... 280/150 AB Primary Examiner—Kenneth H. Betts
Assistant Examiner—Leslie J. Paperner
Attorney—W. E. Finken et al.

[57] ABSTRACT

A velocity responsive sensor operative upon impact engagement of a vehicle with an obstacle to sense the total change in vehicle velocity in a short deceleration time period and actuate the occupant restraint prior to the onset of significant deceleration of the occupant compartment of the vehicle if the change in vehicle velocity is greater than a predetermined value. The sensor includes upper and lower frames which open to each other and provide a housing. Each frame encloses and mounts a like sensor including an elongated planar spring arm having one end portion mounted to the frame and the other end portion slidably engaging an abutment surface lying in a vertical plane intersecting the vertical plane of the one end portion at an acute angle. A mass mounted on the other end portion moves horizontally into engagement with a compression spring contact when the free portion of the arm deflects horizontally relative to the one end portion of the arm. A stop for the free portion of the arm includes an arcuate rib on the frame tangentially related to the one end portion of the arm and wrappinly engaged by the arm adjacent such one end portion upon deflection of the free portion of the arm and engagement of the mass with the spring contact. The time period for the mass to change its energy and move into engagement with the spring contact is comparable to or greater than the deceleration time period of the vehicle. The mass and spring contact are connected across a source of power and an occupant restraint.

3 Claims, 6 Drawing Figures

PATENTED NOV 27 1973

VELOCITY RESPONSIVE SENSOR FOR VEHICLE OCCUPANT RESTRAINTS

This invention relates generally to velocity responsive sensors for vehicle occupant restraint systems and more particularly to such sensors which sense the total change in vehicle velocity in a short deceleration time period and actuate an occupant restraint prior to the onset of significant deceleration of the occupant compartment of the vehicle if the total change sensed is greater than a predetermined value.

Inflatable occupant restraint systems for vehicles are well known. Such systems include an inflatable occupant restraint cushion within the occupant compartment of a vehicle. The cushion is inflated from a pressure fluid source upon impact of the vehicle with an obstacle. The impact may be conventionally detected by an electrical contact switch mounted on the bumper and closed by the impact, various devices actuated by a predetermined distance of movement of the bumper or the mounting structure for the bumper, or one or more acceleration responsive sensors mounted on vehicle body structure, such as the firewall or toe pan, and actuated when the sensor receives an acceleration pulse of predetermined amplitude and time from such structure. Such sensors receive the pulses after the pulses have traveled through the body structure intervening between the point of impact and the sensor. If the pulse is not of the required amplitude and time when it reaches the sensor, the sensor is not actuated. Likewise, there is a time delay or interval between the time of initial impact of the vehicle with an obstacle and the time at which the pulse reaches the sensor. Such time delay varies with the particular body structure on which the sensor is mounted, the intervening body structure, the presence of energy absorbing structure between the point of impact and the intervening body structure, as well as other factors. The sensors must therefore be calibrated in accordance with the particular vehicle on which they are to be used, the area of such vehicle on which they are to be mounted, and damping of any impact generated pulses between the impact point of origin and the sensor.

Acceleration responsive sensors may include a mass which is constrained against movement from an unactuated to an actuated position by springs or magnets which apply a preload force to the mass. Generally the preload force is quite high in order that the sensor be calibrated and that the mass not inadvertently move to an actuated position under normal driving conditions or under certain abnormal driving conditions which do not involve impact of the vehicle with an obstacle or do involve such an impact but at a level at which it is not necessary to inflate the cushion. The distance of movement of the mass to actuated position is usually relatively short, such as ½ inch, and the preload force applied to the mass is quite high.

The sensor of this invention includes upper and lower frames of dielectric material, each of which encloses and mounts a like sensor. The frames open to each other and provide a housing for the redundant sensors. Each frame is generally of triangular shape and includes a base wall and a continuous side wall. Planar mounting and abutment surfaces are spaced from each other on a leg of the side wall and lie in planes intersecting each other at an acute angle. An elongated planar leaf spring member has one end portion seating on the mounting surface and secured to the housing. The other end portion of the spring member mounts a mass and slidably engages the abutment surface to deflect the free portion of the spring member from its normal undeflected position. The acute angle is in the order of 8°, 4° of which provide a preload force and 4° of which ensure uniformity of response time for the mass for impacts directed 30° to either side of a perpendicular to the abutment surface. A columnar deflectable contact spring is mounted on another leg of the side wall and is deflectably engaged by the mass upon deflection of the free portion of the spring member and actuation of the sensor. The contact spring and the mass are connected across both diagnostic and actuating circuits. The housing further includes a rib extending between the contact spring mounting and the planar mounting surface and having an arcuate portion tangentially related to the mounting surface and wrappingly engaged by the free portion of the spring member upon deflection thereof to control such deflection and prevent overstressing of the free portion when the mass moves into engagement with the spring contact.

The sensor is mounted on the bumper or any other portion of the vehicle which experiences a rapid change in velocity upon impact of the vehicle with an obstacle. The sensor may also be mounted remote from the bumper or such portion of the vehicle and connected thereto so as to be simultaneously subjected to any changes in velocity experienced thereby.

In front end impacts, the bumper of the vehicle is ordinarily the first part of the vehicle which contacts the obstacle and likewise the first part of the vehicle which comes to a complete rest while the remainder of the vehicle is still decelerating. Actual tests have shown that an interval of 3 to 8 ms occurs between the time of initial bumper contact with an obstacle and the time that movement of the bumper ceases, in an impact of a 28 to 30 mph barrier equivalent. Thus, substantially the total change in velocity of the bumper occurs prior to the total change in velocity of the occupant compactment and prior to the onset of any significant deceleration of the occupant compartment. The sensor is subjected to this same total velocity change simultaneously with the bumper and initiates actuation of an occupant restraint within the occupant compartment prior to any significant deceleration of the compartment when the sensor detects the occurrence of a change in vehicle velocity above a predetermined value.

The spring and mass of the sensor have a period of natural frequency which is comparable to or greater than the deceleration time period of the bumper or other portion of the vehicle on which the sensor is mounted. The period of natural frequency is set in accordance with the desired change in velocity and the time period of such change which must occur before the sensor initiates actuation of the occupant restraint. The movement of the mass to actuated position is therefore primarily responsive to a change in velocity of the portion of the vehicle on which the sensor is mounted occurring within a certain time period. It is not due primarily to the receipt by the sensor of an acceleration pulse generated by impact. While an instantaneous change in velocity of any portion of the vehicle is unobtainable, in other words, it is impossible to instantaneously stop any portion of the vehicle upon impact with an obstacle, the change in velocity of the bumper or other portion of the vehicle on which the sensor is mounted occurs so rapidly that the actuation of the sensor is closely related to the change in velocity of the sensor and to a minor extent, to the deceleration of the sensor.

Since the sensor of this invention initiates inflation of the cushion when a predetermined change in velocity of a portion of the vehicle occurs, the occupant restraint is actuated in sufficient time for use by an occupant prior to the onset of any significant deceleration of the passenger compartment or of such occupant. The sensor is relatively insensitive to the body structure of the particular vehicle and the response time is relatively fast since there is no time delay or interval between any generation of an acceleration pulse and receipt of such pulse by the sensor.

One of the features of the sensor of this invention is that it includes an elongated spring arm secured at one end portion to a vehicle mounted support and mounting a mass at the other end portion thereof, the free portion of the spring arm being deflectable relative to the support upon impact of the vehicle with an obstacle and the occurrence of a predetermined change in vehicle velocity in a short deceleration time period to move the mass into engagement with a contact and actuate a vehicle occupant restraint, the time period for the mass to change its energy and move into engagement with the contact being comparable to or greater than the deceleration time period of the vehicle. Another feature is that the deflection of the free portion of the spring arm is controlled by an arcuate stop surface tangentially related to the free portion of the spring arm and wrappingly engaged thereby adjacent its secured end portion. A further feature is that the contact includes a columnar spring which deflects relative to its mounting on the support when engaged by the mass. Yet another feature is that the support is a generally triangularly shaped housing, the spring arm being located at one side of the housing, and the spring contact and arcuate stop surface being located at the other side of the housing. Yet a further feature is that the housing is of dielectric material and includes planar mounting and abutment surfaces respectively seating the one and the other end portions of the spring arm, the surfaces lying in vertical planes intersecting each other at a predetermined acute angle. Still another feature is that the columnar spring is mounted on a third planar surface angularly related to the mounting and abutment surface, the arcuate stop means being provided by a rib connecting the third planar surface and the mounting surface and tangent to the latter. Still a further feature is that the rib spans the other side of the housing.

These and other features of the sensor of this invention will be readily apparent from the following specification and drawings wherein.

Figure 1:
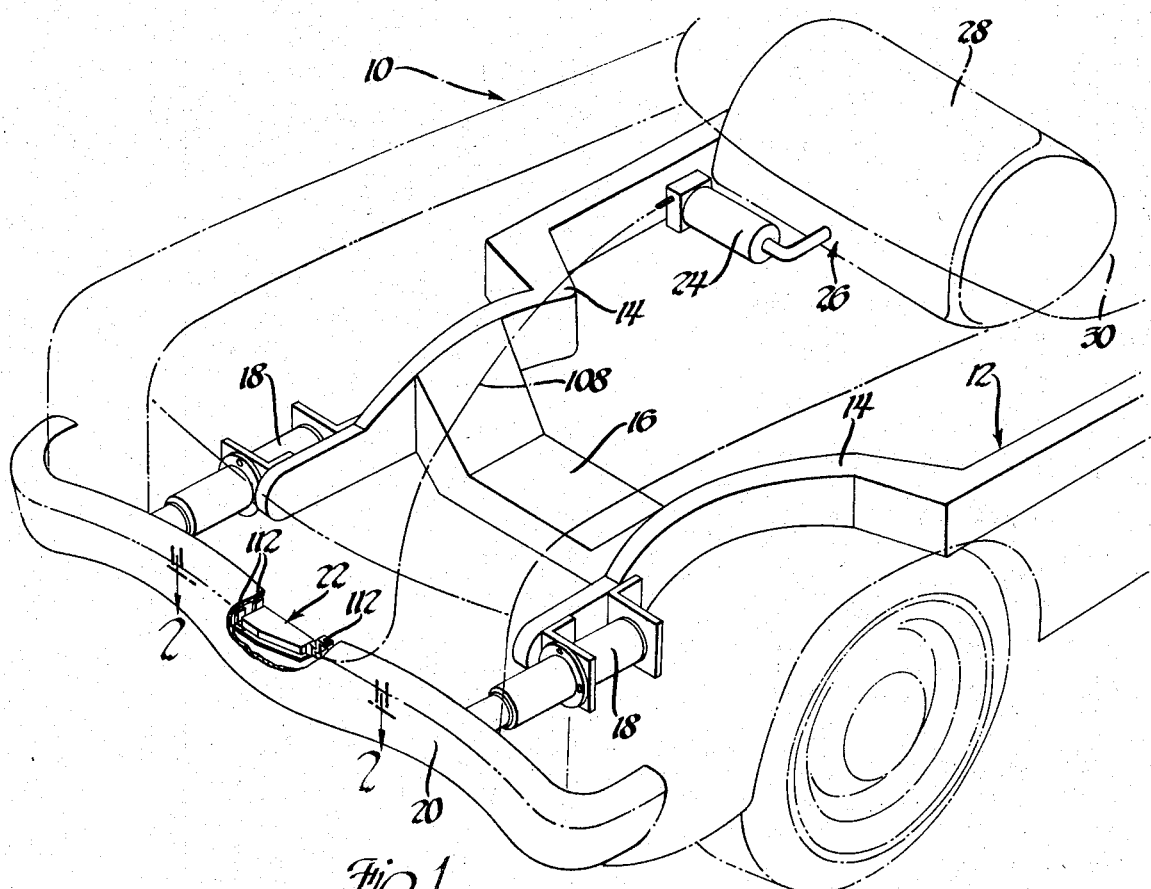
FIG. 1 is a perspective view of a portion of a vehicle having a sensor according to this invention for actuating an occupant restraint of the inflatable cushion type.

Referring now particularly to FIG. 1 of the drawings, a vehicle designated generally 10 includes a frame 12 having a pair of frame rails 14 connected adjacent their forward ends by a cross frame member 16 providing a support for the vehicle power plant, not shown. A like pair of energy absorbing struts 18, respectively mounted on the rails 14 at their forward ends, mount the vehicle bumper 20. A sensor 22 according to this invention is mounted on the bumper 20 and actuates a gas generator 24 of the occupant restraint system 26 of the vehicle. When the gas generator is actuated, it supplies pressure fluid to inflate an inflatable occupant restraint cushion 28 which is mounted within the occupant compartment 30 of the vehicle. The occupant restraint system 26, including the gas generator, the cushion, and the connecting manifold and diffuser structure is conventional and well known to those skilled in the art. Accordingly, it is not believed that any further description need be given.

Referring now to FIGS. 2 through 6 of the drawings, the sensor 22 includes upper and lower open frames 32 and 34, respectively, of like asymmetrical shape and molded of dielectric material. Each frame houses a sensor of like construction and, accordingly, only the lower frame and sensor will be described in detail. It will be understood that the upper frame and sensor are of like construction, unless otherwise noted, and that like parts thereof will be indicated by prime numerals.

Figure 2:
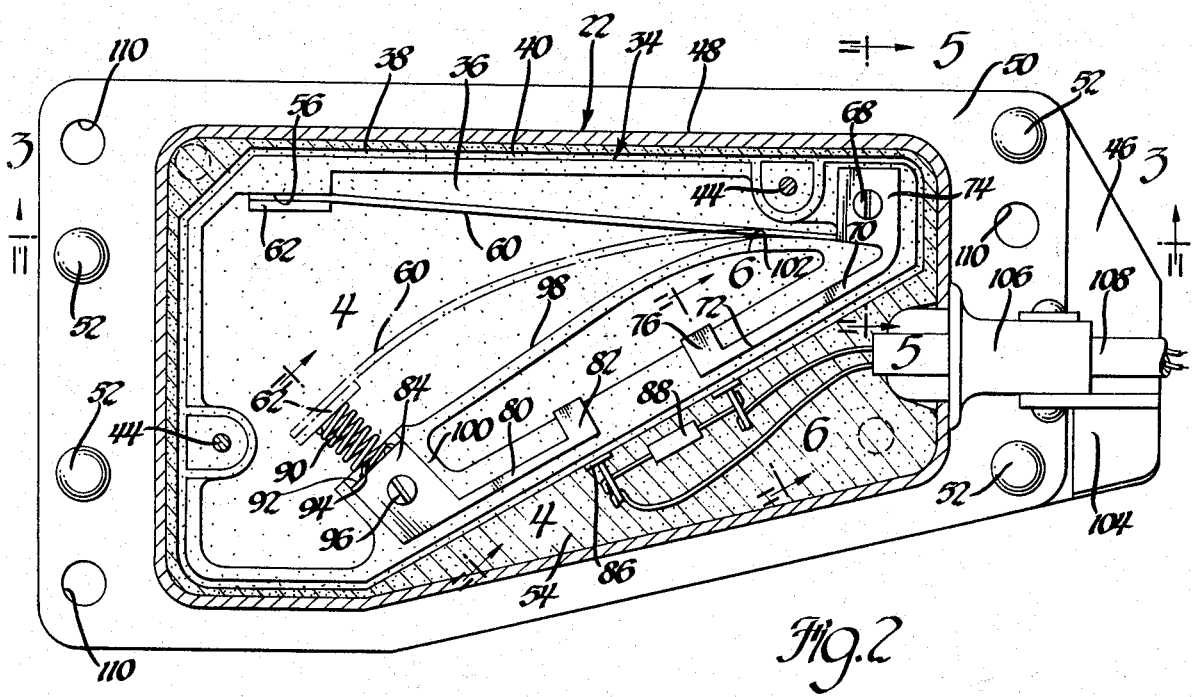
FIG. 2 is an enlarged view taken generally along the plane indicated by line 2—2 of FIG. 1.
Figure 3:
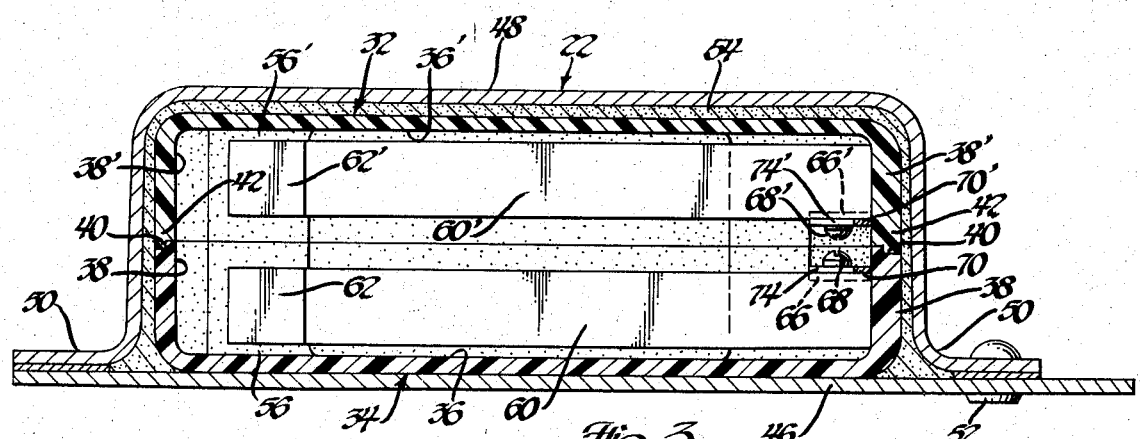
FIG. 3 is a sectional view taken generally along the plane indicated by line 3—3 of FIG. 2.

The frame 34, as shown in FIG. 2, is generally of triangular shape and includes a base wall 36 and a continuous peripheral wall 38. As best shown in FIGS. 3 through 6, the upper edge of wall 38 includes a continuous peripheral shoulder 40 which receives a continuous peripheral rib 42 on the lower edge of wall 38' so that the edges interfit and the frames 32 and 34 close each other to provide an enclosure or housing for the redundant sensors contained therein. The interfitting edges are adhesively secured to each other.

A number of rivets 44, extending through aligned openings in walls 38 and 38', further secure the frames 32 and 34 to each other and to a base plate 46 of a mounting bracket assembly. The assembly includes an upper cover 48 of a cross sectional shape as shown in FIG. 2 and having a peripheral flange 50 which is riveted at 52, FIG. 2, to plate 46. The cover 48 is larger in size than the frames 32 and 34, as can be seen from FIG. 2, and the space therebetween is filled with any suitable sealant 54, such as lithium grease, as indicated.

As shown in FIG. 2, the peripheral wall 38 of housing 34 includes a vertical abutment surface 56 formed integrally therewith and facing forwardly of the vehicle as will be explained. Spaced from this abutment surface is a vertical slot 58, FIG. 5, formed in an enlargement of wall 38. The surface 56 and the walls of slot 58 lie in vertical planes intersecting each other at a predetermined included acute angle. In the specific embodiment shown, this angle is 8° and will be further explained. A leaf spring arm or member 60 of predetermined elastic characteristics has a mass 62 secured to one end portion thereof. The other end portion of the arm seats on one wall or planar mounting surface of slot 58, FIG. 5, and includes an integral return bent flange 64 seating on the other wall to wedgingly mount the spring arm to wall 38. An integral lateral flange 66 of the spring arm is received in a recess of the enlargement of wall 38 and secured thereto by a screw 68 threaded into an opening of the enlargement. Since the planar surface 56 and planar mounting surface of slot 58 are located at an acute angle, shown as 8°, relative to each other, the free portion of the spring arm 60 is slightly deflected from its normal undeflected position as shown in FIG. 2. 4° of this angle provides a preload force normally locating the spring arm and the mass 62 in their unactuated position as shown in FIG. 2, and 4° ensures uniformity of response time for the mass for impacts of the bumper directed 30° to either side of a perpendicular to the abutment surface 56.

Figure 5:
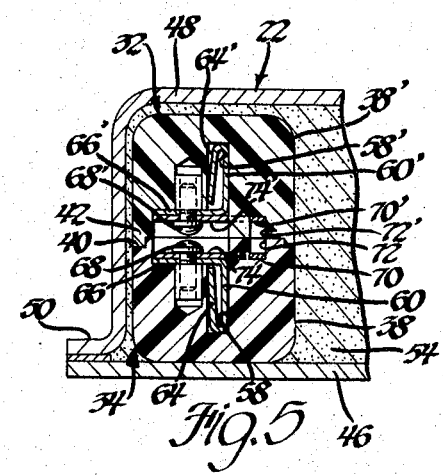
FIG. 5 is a sectional view taken generally along the plane indicated by line 5—5 of FIG. 2.
Figure 6:
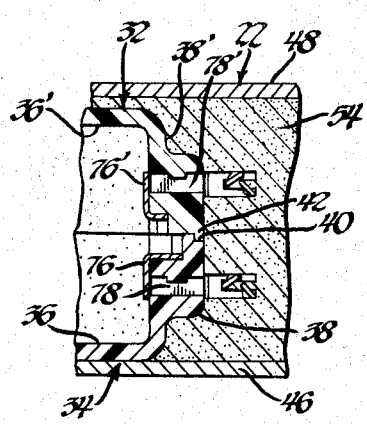
FIG. 6 is a sectional view taken generally along the plane indicated by line 6—6 of FIG. 2.

A conductor 70 is received within an integral groove 72 of wall 38 and includes an extension 74 at one end and an angular extension 76 at the other end. As shown in FIG. 5, the extension 74 overlies the flange 64 of spring arm 60 and is secured to the recess of the enlargement of wall 38 by the same screw 68. The angular extension 76, as shown in FIG. 6, is welded to a contact post 78 which is molded within the wall 38 and extends therethrough.

Another conductor 80 is likewise received within an integral groove of wall 38 and includes an angular extension 82 at one end thereof and another angular extension 84 at the other end thereof. Extension 82 is welded to a contact post 86, FIG. 2, molded within wall 38 in the same manner as contact post 78. The contact posts are connected across a 600 ohm resistor 88.

Figure 4:
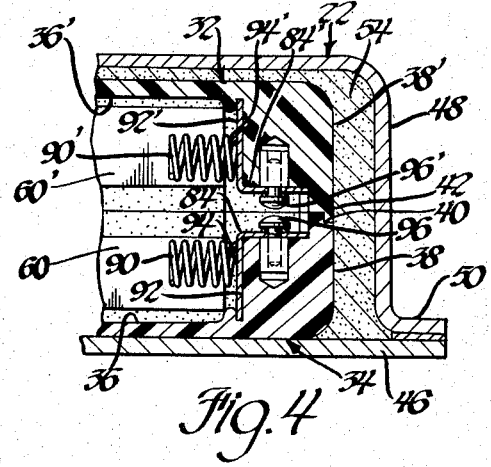
FIG. 4 is a sectional view taken generally along the plane indicated by line 4—4 of FIG. 2.

A contact 90 in the form of a columnar coil spring is mounted on the flange 92 of extension 84 as best shown in FIG. 4. Integral tabs 94 are struck out of the flange 92 and are then bent over the lowermost coil of the contact 90 to secure the contact to the extension. The extension 84 is further secured in place within the groove of the wall 38 by a screw 96.

As best shown in FIG. 2, an integral rib 98 of frame 34 extends generally vertically with respect to the base wall 36 of the frame. The rib 98 extends between the enlargement of wall 38 containing slot 58 and the enlargement 100 of the wall 38 which contains the integral groove receiving conductor 80 and the flange 84 thereof. The rib 98 is generally linear except for the arcuate vertical surface portion 102 thereof which merges tangentially into the wall of slot 58 against which the spring member 60 seats as shown in FIG. 5. The rib 98 provides a stop surface for the spring member 60, and particularly, the surface portion 102 thereof is wrappingly engaged by the spring member 60 when this member deflects to actuated position as shown in dash lines in FIG. 2 to limit the deflection of the spring member and prevent any overbending or stress thereof.

From the foregoing description, it can be seen that the frame 34 including its mounting and abutment surfaces provided by the slot 58 and the surface 56, respectively, as well as the grooves which receive the conductors 70 and 80 and the rib 98, is of integrally molded one-piece construction.

An angle bracket 104 welded to plate 46, FIG. 2, supports a lead 106. A coaxial type wiring harness 108 extends through the lead 106 and then into the cover 48 wherein it is connected to the contact posts 78 and 86 of each of the frames 32 and 34. The harness 108 is grounded to the plate 46 in a known manner.

The sensor 22 is essentially comprised of two like sensors which are calibrated to the same constants so that both will be actuated when the bumper 20 of the vehicle experiences a velocity change of predetermined value. The sensor 22 is fixedly secured to the bumper 20 by a number of bolts, not shown, which extend through aligned openings 110 in the flange 50 of cover 48 and also in plate 46 and through like openings in a series of brackets 112 which are secured in a known manner to the bumper 20, such as to the upper wall thereof as shown in FIG. 1. By thus fixedly securing the sensor 22 to the bumper 20, the changes in velocity experienced by the bumper 20 are likewise experienced by the sensor 22. It might also be noted at this point that the sensor 22 is mounted to the bumper 20 in a horizontal position with the surface 56 facing forwardly of the vehicle so that the spring member 60 and mass 62 are positioned generally vertically but face horizontally.

When the bumper 20 experiences a change in velocity of predetermined value, both spring members 60 and 60' as well as their respective masses 62 and 62' move horizontally forwardly of the bumper 20 to each close against the respective other contacts provided by the respective springs 90 and 90'. Thus, action of each will be generally simultaneously. When the respective masses close against their respective springs, the springs can deflect axially under the like columnar loads applied by the masses 62 as they engage the springs, and likewise the springs can deflect about their lowermost mounted coil as required. When the respective masses 62 close to the respective contacts 90 and 90', respective circuits are completed across the spring members 60 and the springs 90 and 90'. One lead of the wiring harness 108 is connected to the post 78 and thence by the conductor 70 to the spring arm 60, while another lead of the harness 108 is connected to the post 86 and to the spring 90 by the conductor 80, with the posts being connected across the resistor 88 as previously mentioned. Other leads of the harness 108 are likewise connected to posts 78' and 86'.

As schematically shown in FIG. 1, the wiring harness 108 interconnects the sensor 22 and the gas generator 24 of the occupant restraint system 26. Although not shown herein since it is not necessary to an understanding of this invention, it will be understood that the wiring harness 108 is part of an actuation circuit which includes the vehicle battery which furnishes power for firing the gas generator 24 to inflate the cushion 28 when the sensors which form the sensor 22 are both actuated. A suitable actuation circuit is known to those skilled in the art. For such a circuit which additionally includes backup and monitoring, reference may be had to Ser. No. 190,978 Dillman et al, filed Oct. 20, 1971 and assigned to the assignee of this invention. In such disclosure, the sensors which form the sensor 22 will comprise the switches 10a and 10b.

As has been previously stated, the sensor is mounted on a portion of the vehicle which comes to rest in a time period which is short compared to the decelerating time of the occupant compartment. In such a location, it has been shown that the amplitude of the deceleration pulse is not a reliable indication of crash severity—crash severity being a measure of injury—to the vehicle occupant. It is only by making the sensor responsive primarily to velocity that discrimination of crash intensity can be made as will be demonstrated later. The velocity sensitive nature of this sensor is based on the concept of a simple mass supported on a simple spring. If an impulse, an instantaneous change in velocity, $V_o$, is imparted to the mass, the maximum excursion of the mass, $S_o$, and maximum acceleration of the mass, $A_o$, are given by the well-known relationships describing a steady state, undamped oscillation:

$$V_o = S_o W$$

$$A = V_o W$$

The value of W is given by the well-known relationship $W = \sqrt{K/M}$, where K is the elastic constant of the spring and M is the mass supported on the spring (and in this case, it includes not only the supported mass, but also the total mass of the restraining springs). The selection of W is basic to this invention as will be shown by a table of values. Impulses which are comparable to or shorter than the natural period of the spring mass arrangement introduce only that amount of error in the measurement of true velocity which is desirable and necessary in a sensor. If the sensor responded perfectly to a change in velocity, it would actuate whenever a predetermined change in velocity of the vehicle occurred, such as that due to normal vehicle braking. This is clearly undesirable. It can be further shown that for a "hard" crash, such as a crash into a rigid barrier, actuation should occur at a lower speed and in a faster time than in a "soft" crash, such as into the side of another vehicle. It is a feature of this invention that by a proper combination of resonant frequency, mass distance to the contacts, and location and orientation of the sensor, the sensor can be designed to actuate under different crash conditions in different times and different velocities so that in each case it can subject the occupant of the vehicle to an impact severity which is approximately equal in spite of the large variations in impact conditions.

A quantitative measure of crash severity can be assigned by describing the shape and time duration of the acceleration pulse for a given velocity change. Experience has shown that a "hard" or barrier crash is often represented by a damped sine wave of a period of oscillation, $\tau$, of 4 to 8 milliseconds. A "soft" crash can be represented by a haversine. Experience has shown that most crashes have a deceleration pulse that lies somewhere between the damped sine wave and a haversine. The calculated values of threshold velocity and actuation times of a particular sensor experiencing these two inputs for various input time constants, $\tau$, are presented in the following table which shows the firing times for various pulse periods for a sensor calibrated to fire at a change in velocity of 11 mph.

quantities in the table are given by the following equations.

Equation for a haversine pulse:

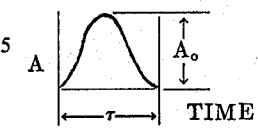

$A = \dfrac{V}{386\tau} \left(1 - \cos \dfrac{2\pi}{\tau} t\right)$
A = acceleration in Gs
V = velocity in inches/sec.
$\tau$ and $t$ in seconds Equation for a damped sine wave:

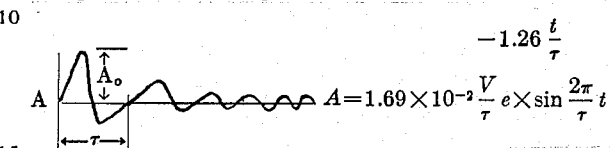

$A = 1.69 \times 10^{-2} \dfrac{V}{\tau} e^{-1.26 \frac{t}{\tau}} \sin \dfrac{2\pi}{\tau} t$ It is instructive to note that certain low speed crashes have higher values of acceleration than some high speed crashes. Since the sensor has no way of knowing the kind of crash that it will be involved in, its response must not be acceleration dependent, but rather primarily velocity dependent as already stated. For example with a damped sine wave input having a time constant, $\tau$, of 2 ms, the threshold value of the sensor (the value below which the sensor will not actuate) is 10.6 mph and the peak G value experienced by the sensor is 1580. The time for the sensor to fire after initiation of the pulse is 13.5 ms. Clearly, the sensor is primarily responsive to velocity.

The $A_o$ values in the table may be compared with similar values of an acceleration responsive sensor. In such a sensor, $A_o$ would be approximately equal to 15Gs. While both sensors use what may be termed spring mass systems, it can be seen that the spring mass system of the subject sensor is relatively immune to acceleration pulses and is responsive only to a predetermined change in vehicle velocity in a predetermined time period while the acceleration responsive sensor is responsive only to acceleration pulses of much lower magnitude and is not responsive to changes in vehicle velocity.

Since the sensor 22 does not depend upon any deceleration pulse reaching it through intervening body structure, it can accurately detect the velocity of the vehicle immediately prior to the impact. Any resonance or noise caused by the impact has no effect on the sensor since it does not depend on a deceleration pulse reaching it through any intervening body struc-

11 m.p.h. SENSOR RESPONSE

| | | Input acceleration pulse characteristics | | | | | |
|---|---|---|---|---|---|---|---|
| | | Haversine | | | Damped sine | | |
| Impact velocity | Pulse period (m.s.) $\tau$ | Velocity fire m.p.h. | Fire time m.s. | Peak "G" $A_o$ | Velocity fire m.p.h. | Fire time m.s. | Peak "G" $A_o$ |
| Threshold velocity (nominally 11 m.p.h.) | 10 | 11.48 | 18.0 | 104.6 | | | |
| | 20 | 12.7 | 33.4 | 57.7 | | | |
| | 30 | 14.4 | 29.3 | 43.7 | | | |
| | 40 | 16.6 | 34.2 | 37.8 | | | |
| | 2 | | | | 10.6 | 13.5 | 1,580 |
| | 6 | | | | 10.5 | 14.1 | 582 |
| | 8 | | | | 10.2 | 14.1 | 380 |
| | 16 | | | | 13.4 | 13.4 | 169 |

The parameters of the sensor on which the table is based are:
- $M_T$ (mass weight) = 0.0036 gram
- K = 0.232 lb/in
- X (distance of mass to travel to contacts) = 1.6 in.
- $F_o$ (preload force) = 0.058 lb.
- W = 114 radians/second
- $\tau$ = 55 ms The area under all acceleration curves is velocity by definition. The interdependence of $A_o$, $\tau$ and V for the ture. The sensor 22 can receive impact information and actuate the cushion before the occupant or the occupant compartment has experienced any significant deceleration and before an acceleration responsive sensor could receive the same information and actuate the cushion.

To summarize, the sensor 22 of the system of this invention includes a mass having a period of natural frequency which is comparable to or larger than the deceleration time period of the bumper or other portion of the vehicle on which the sensor is mounted and which is subjected to impact forces so as to experience a total change in velocity before the occupant compartment experiences such total change or experiences any significant deceleration. While the sensor 22 may be mounted on the bumper or other portion of the vehicle, it may also be mounted remote from the bumper or portion of the vehicle and rigidly connected thereto, such as by stiff rods, such that the sensor 22 experiences the same deceleration within the same time period as the bumper or other portion of the vehicle.

It should also be noted that the sensor 22 shown herein has directional sensitivity in that it is responsive to horizontal pulses received within the included angle of 30° to either side of a perpendicular to surface 56.

While a specific example of a sensor has been disclosed herein, one set to fire at a change in velocity of 11 mph within a certain time period, the sensor, of course, can be set to fire at other changes in velocities within similar time periods.

Thus, this invention provides an improved velocity responsive sensor for vehicle occupant restraints.

I claim:

1. In combination with a vehicle including an occupant compartment and an occupant restraint, a velocity responsive sensor operative upon impact engagement of the vehicle with an obstacle to sense the total change in vehicle velocity in a short deceleration time period prior to the onset of significant deceleration of the occupant compartment and actuate the occupant restraint, comprising, a housing mounted on the vehicle and including spaced mounting means and abutment means lying in planes intersecting each other at a predetermined included acute angle, an elongated spring member having one end portion thereof secured to the mounting means, the other end portion of the spring member seating on the abutment means to deflect the free portion of the spring member from normal undeflected position, a mass secured to the other end portion of the spring member, contact means mounted on the housing in spaced relationship to the abutment means and engageable by the mass upon deflection of the free portion of the spring member relative to the secured end portion thereof, the time period for the mass to change its energy and move into engagement with the contact means being comparable to or greater than the deceleration time period of the vehicle whereby engagement of the mass with the contact means is responsive to the occurrence of a change in vehicle velocity greater than a predetermined value, means on the housing tangential to the one secured end portion of the spring member and wrappingly engaged by the free portion of the spring member adjacent the one secured end portion thereof upon movement of the mass into engagement with the contact means to thereby limit and control the deflection of the free portion of the spring member, and circuit means connecting the spring member and the contact means across a source of power and the occupant restraint, movement of the mass into engagement with the contact means actuating the occupant restraint when the housing is subjected to substantially the total change in velocity of the vehicle in a short deceleration time period prior to the onset of significant deceleration of the occupant compartment of the vehicle.

2. In combination with a vehicle including an occupant compartment and an occupant restraint, a velocity responsive sensor operative upon impact engagement of the vehicle with an obstacle to sense the total change in vehicle velocity in a short deceleration time period prior to the onset of significant deceleration of the occupant compartment of the vehicle and actuate the occupant restraint, comprising, a housing mounted on the vehicle and including spaced planar mounting and abutment surfaces lying in planes intersecting each other at a predetermined included acute angle, an elongated planar spring member having one end portion thereof seating on the mounting surface, means securing the one end portion of the spring member to the housing, the other end portion of the spring member seating on the abutment surface to deflect the free portion of the spring member from normal undeflected position, a mass secured to the other end portion of the spring member, contact means mounted on the housing in spaced relationship to the abutment surface and engageable by the mass upon deflection of the free portion of the spring member relative to the one end portion thereof, the time period for the mass to change its energy and move into engagement with the contact means being comparable to or greater than the deceleration time period of the vehicle whereby engagement of the mass with the contact means is responsive to the occurrence of a change in vehicle velocity greater than a predetermined value, arcuate rib means on the housing tangential to the mounting surface and wrappingly engaged by the free portion of the spring member adjacent the one end portion thereof upon movement of the mass into engagement with the contact means to thereby limit and control the deflection of the free portion of the spring member, and circuit means connecting the spring member and the contact means across a source of power and the occupant restraint, movement of the mass into engagement with the contact means actuating the occupant restraint when the housing is subjected to substantially the total change in velocity of the vehicle in a short deceleration time period prior to the onset of significant deceleration of the occupant compartment of the vehicle.

3. In combination with a vehicle including an occupant compartment and an occupant restraint, a velocity responsive sensor operative upon impact engagement of the vehicle with an obstacle to sense the total change in vehicle velocity in a short deceleration time period prior to the onset of significant deceleration of the occupant compartment of the vehicle and actuating the occupant restraint, comprising, a housing mounted on the vehicle and including spaced planar mounting and abutment surfaces lying in planes intersecting each other at a predetermined included acute angle, an elongated planar spring member having one end portion thereof seating on the mounting surface, means securing the one end portion of the spring member to the housing, the other end portion of the spring member seating on the abutment surface to deflect the free portion of the spring member from normal undeflected position, a mass secured to the other end portion of the spring member, a columnar contact spring mounted on the housing in spaced relationship to the abutment surface and engageable by the mass upon deflection of the free portion of the spring member relative to the one end portion thereof, the time period for the mass to change its energy and move into engagement with the contact spring being comparable to or greater than the deceleration time period of the vehicle whereby engagement of the mass with the contact spring is responsive to the occurrence of a change in vehicle velocity greater than a predetermined value, spring member stop means on the housing including an arcuate surface tangentially related to the mounting surface and wrappingly engaged by the free portion of the spring member adjacent the one end portion thereof upon movement of the mass into engagement with the contact spring to thereby limit and control the deflection of the free portion of the spring member, and circuit means connecting the spring member and the contact spring across a source of power and the occupant restraint, movement of the mass into engagement with the contact spring actuating the occupant restraint when the housing is subjected to substantially the total change in velocity of the vehicle in a short deceleration time period prior to the onset of significant deceleration of the occupant compartment of the vehicle.

* * * * *